(12) United States Patent
Irvin

(10) Patent No.: US 6,832,314 B1
(45) Date of Patent: Dec. 14, 2004

(54) METHODS AND APPARATUS FOR SELECTIVE ENCRYPTION AND DECRYPTION OF POINT TO MULTI-POINT MESSAGES

(75) Inventor: David R. Irvin, Raleigh, NC (US)

(73) Assignee: Ericsson, Inc., Research Triangle Park, NC (US)

( * ) Notice: Subject to any disclaimer, the term of this patent is extended or adjusted under 35 U.S.C. 154(b) by 0 days.

(21) Appl. No.: 09/464,363

(22) Filed: Dec. 15, 1999

(51) Int. Cl.[7] .......................... H04L 9/00; H04L 12/56; H04Q 7/00

(52) U.S. Cl. ...................... 713/162; 713/160; 713/163; 713/168; 370/360; 370/395.64

(58) Field of Search ................................ 713/160, 162, 713/163, 168; 370/342, 389, 395.64, 360, 395

(56) References Cited

U.S. PATENT DOCUMENTS

| | | | |
|---|---|---|---|
| 5,987,137 A | | 11/1999 | Karppanen et al. ............ 380/28 |
| 6,028,860 A | * | 2/2000 | Laubach et al. ....... 370/395.64 |
| 6,130,623 A | * | 10/2000 | MacLellan et al. .......... 340/5.1 |
| 6,137,793 A | * | 10/2000 | Gorman et al. .............. 370/360 |
| 6,324,395 B1 | * | 11/2001 | Khayrallah et al. ......... 455/406 |
| 2003/0007465 A1 | * | 1/2003 | Artzi ........................... 370/316 |

FOREIGN PATENT DOCUMENTS

EP        0 944 275 A2    3/1999

OTHER PUBLICATIONS

Li Gong and Nachum Schacham, *Multicast Security and its Extension to a Mobile Environment, Wireless Networks*, vol. 1, No. 3, Oct. 1, 1995, pp. 281–295.
Copy of International Search Report for PCT/US00/29595.

* cited by examiner

Primary Examiner—Gilberto Barrón
Assistant Examiner—Abdulhakim Nobahar
(74) Attorney, Agent, or Firm—Myers Bigel Sibley & Sajovec

(57) ABSTRACT

Methods and systems for selectively encrypting and decrypting messages transmitted on a channel of a communication network, such as a broadcast channel, are provided. Group encryption keys are provided for one or more services utilizing the broadcast channel to communicate messages. A message associated with a particular service first receives an error check value, such as a cyclical redundancy check (CRC) value generated from the unencrypted message. The message is then encrypted using the group encryption key for the service and the CRC is added to the encrypted message and transmitted with a broadcast address of the communication network. A receiver then receives the message and determines that the CRC indicates an error (as it is generated from the encrypted message rather than the unencrypted message). The receiver then decrypts the message using the group encryption key for the service (assuming the receiver is authorized to receive the service, i.e., has access to the group encryption key) and generates a CRC from the decrypted message. If this CRC matches the CRC received with the message, the receiver recognizes the message as being associated with the corresponding service and processes the message accordingly. Where multiple services are supported and the receiver has a corresponding plurality of group encryption keys, each encryption key can be tested until a CRC without error is provided thereby indicating the service with which the message is associated.

44 Claims, 8 Drawing Sheets

US 6,832,314 B1

METHODS AND APPARATUS FOR SELECTIVE ENCRYPTION AND DECRYPTION OF POINT TO MULTI-POINT MESSAGES

BACKGROUND OF THE INVENTION

The present invention relates to communications methods and apparatus, and more particularly, to communications methods and apparatus using encryption.

Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

FIG. 1 illustrates a typical terrestrial cellular radiotelephone communication system 20. The cellular radiotelephone system 20 may include one or more radiotelephones (mobile terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 typically has allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Several types of access techniques are conventionally used to provide wireless services to users of wireless systems such as those illustrated in FIGS. 1 and 2. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity. Modern digital wireless systems typically utilize different multiple access techniques such as time division multiple access (TDMA) and/or code division multiple access (CDMA) to provide increased spectral efficiency. In TDMA systems, such as those conforming to the GSM or IS-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

Communications in a wireless communications system such as the systems of FIGS. 1 and 2 typically make use of different addressing modes for messages sent out by base stations over a broadcast control channel. Messages may be sent to a broadcast address of the communications system, i.e. addressed to all the mobile terminals (receiver devices or receivers) served by the system, or sent to an individual address associated with a specific mobile terminal. The use of broadcast (point to multipoint) addresses may avoid undue network traffic when a particular message is of interest to more than one receiver. Receivers supported by such systems are preferably configured with both a broadcast address and an individual address so they may access both types of messages. Such systems may also use encryption to provide greater privacy for communications broadcast on control channels which may be subject to interception by receivers other than the intended recipient.

One problem with such prior art systems is that all mobile terminals having the proper broadcast address may access all messages broadcast with the broadcast address. Thus, it is problematic to conveniently use the same channel to send both messages that are intended to be received generally and those that are intended to be received by only a subset of the potential receivers. This is particularly problematic with the expansion of services available on such communications networks, including the introduction of premium services such as, for example, stock quotes or weather updates. Service providers desire a method to control billing for such premium services and control access to such premium services.

One approach previously suggested to the problem of controlling access to premium services is the use of group addresses. A group address may be described as a broadcast address for a subset of receivers. In such a network, each receiver would have a broadcast address, an individual address and, optionally, one or more group addresses. Premium services may then be transmitted using group addresses associated with the premium service. A disadvantage of this approach to controlling access to premium services is the burden of adding and removing receivers from a group. It also places the burden on the address managing system rather than the channel. Fraud prevention concerns may discourage easy changing of receiver addresses in networks such as cellular telephone networks. Furthermore, the use of the group address approach may be subject to eavesdropping, thus making the group addresses subject to interception by those wishing to obtain premium services without payment or to invade the privacy and security of other users. Accordingly, it would be desirable to provide for selective distribution of messages on a broadcast channel which is secure, private and in which inclusion or exclusion from a group may be readily managed.

SUMMARY OF THE INVENTION

The present invention provides methods and systems for selectively encrypting and decrypting messages transmitted on a broadcast channel of a communication network. Group encryption keys are provided for one or more services utilizing the broadcast channel to communicate messages. A message associated with a particular service first receives an error check value, such as a cyclical redundancy check (CRC) value, generated from the unencrypted message. The message is then encrypted using the group encryption key for the service and the CRC is added to the encrypted message and transmitted with a broadcast address of the communication network. A receiver then receives the message and determines that the CRC indicates an error (as it is generated from the encrypted message rather than the unencrypted message). The receiver then decrypts the message using the group encryption key for the service (assuming the receiver is authorized to receive the service, i.e., has access to the group encryption key) and generates a CRC from the decrypted message. If this CRC matches the CRC received with the message, the receiver recognizes the message as being associated with the corresponding service and processes the message accordingly. Where multiple services are supported and the receiver has a corresponding plurality of group encryption keys, each encryption key can be tested until a CRC without error is provided thereby indicating the service with which the message is associated.

In one embodiment of the present invention, a method is provided for selective encryption of transmitted messages. A group encryption key is determined for an unencrypted message and an error check value is determined for the unencrypted message. The unencrypted message is encrypted using the group encryption key. The encrypted message and the error check value are transmitted on a broadcast channel of a communication network with an associated destination address. Preferably, the associated destination address is a broadcast address of the communication network and a group encryption key is selected which is associated with a service generating the message. The error check value may be redundancy bits for the message, such as a CRC, and the unencrypted redundancy bits may be appended to the encrypted message for transmission.

Selective encryption operations may be provided for received unencrypted messages which are intended for a broadcast group having an associated group encryption key and not for other messages. Received unencrypted messages associated with at least one of general broadcast or an individual address may be transmitted on the broadcast channel of the communication network with: the broadcast address of the communication network if the unencrypted message is associated with general broadcast and on the communication network with the individual address if the unencrypted message is associated with an individual address.

In a further embodiment of the present invention, the unencrypted message may be encrypted using a general encryption key if the unencrypted message is associated with at least one of general broadcast or an individual address. An error check value may be generated based on the encrypted message if the unencrypted message is associated with at least one of general broadcast or an individual address. The encrypted message and the error check value based on the encrypted message may then be transmitted on the communication network with the individual address if the unencrypted message is associated with an individual address and with the broadcast address of the communication network if the unencrypted message is associated with general broadcast.

In a further embodiment of the present invention, the encrypted message and added error check value is received on the broadcast channel of the communication network. The receiver device determines if the received message is directed to the broadcast address of the communication network. An error check value is generated for the received message and tested to determine if the error check value indicates an error. The received message is decrypted using the group encryption key if the received message is directed to a broadcast address of the communication network and the error check value indicates an error. An error check value is generated for the decrypted message. The received message is assigned to a group associated with the group encryption key if the error check value for the decrypted message indicates no error. The group encryption key may be determined based on the one of a plurality of services which is associated with the message and selecting a one of a plurality of group encryption keys which is associated with the determined one of the plurality of services which is associated with the message as the group encryption key for the unencrypted message. Decryption and error checking operations may be repeated using selected ones of the plurality of group encryption keys as the group encryption key until either the error check value for the decrypted message indicates no error or each of the selected ones of the plurality of group encryption keys has been used as the group encryption key.

In a further embodiment of the present invention, a request for one of the plurality of group encryption keys is received from a user. The user is associated with a service associated with the requested one of the plurality of group encryption keys and the requested one of the plurality of group encryption keys is transmitted to the user on the broadcast channel of the communication network with an associated individual address of the user. The group encryption key may have an associated duration and the group encryption key may be updated when a previous group encryption key has exceeded its associated duration. The group encryption key may also be updated on a periodic basis and the updated group encryption key may be transmitted to users associated with the service associated with the group encryption key using associated individual addresses of the users associated with the service associated with the group encryption key.

In a further embodiment of the present invention, the transmitted group encryption key and the encrypted message and added error check value are received on the broadcast channel of the communication network and the receiving device determines if the received message is directed to the broadcast address of the communication network. An error check value is generated for the received message to determine if the error check value indicates an error. The received message is decrypted using the group encryption key if the received message is directed to a broadcast address of the communication network and the error check value indicates an error. An error check value is generated for the decrypted message and the received message is assigned to a group associated with the group encryption key if the error check value for the decrypted message indicates no error.

In another embodiment of the present invention, a method of selective decryption of transmitted messages is provided including receiving a message on a broadcast channel of a communication network and determining if the received message is directed to a broadcast address of the communication network. An error check value is generated for the received message to determine if the error check value indicates an error. The received message is decrypted using a group encryption key if the received message is directed to a broadcast address of the communication network and the error check value for the received message indicates an error. An error check value is generated for the decrypted message and the received message is assigned to a group associated with the group encryption key if the error check value for the decrypted message indicates no error. The decryption and error check operations may be repeated for each of a plurality of candidate group encryption keys until either the error check value for the decrypted message indicates no error or each of the plurality of group encryption keys has been used as the group encryption key. The error check value for the decrypted message may be computed as redundancy bits for the decrypted message or by applying an error correction code to the decrypted message and determining that an error is indicated for the decrypted message if any errors remain in the decrypted message after applying the error correction code to the decrypted message.

In a further aspect of the present invention, a selective encryption system is provided including an encryption circuit that encrypts a message using a group encryption key and an error check value generation circuit that generates an error check value based on the unencrypted message and adds the error check value to the encrypted message. A transmitter broadcasts the encrypted message with the added error check value on a broadcast channel of a communication network and an encryption key selection circuit selects one of a plurality of candidate group encryption keys as the group encryption key based on a service associated with the message. In one embodiment, a receiver is provided that requests the group encryption key and the transmitter is configured to transmit the group encryption key with an individual address of a requesting device responsive to receiving a request for the group encryption key.

In another aspect of the present invention, a selective decryption system is provided including a receiver that receives a message on a broadcast channel of a communication network and a decryption circuit that decrypts the message using a group encryption key. An error check value generation circuit generates an error check value for the received message and the decrypted message. A comparator circuit responsive to the error check value generation circuit determines whether an error is indicated for the received message and the decrypted message and a selection circuit responsive to the comparator circuit selects one of the received message or the decrypted message as a message to process.

DETAILED DESCRIPTION

Figure 1:
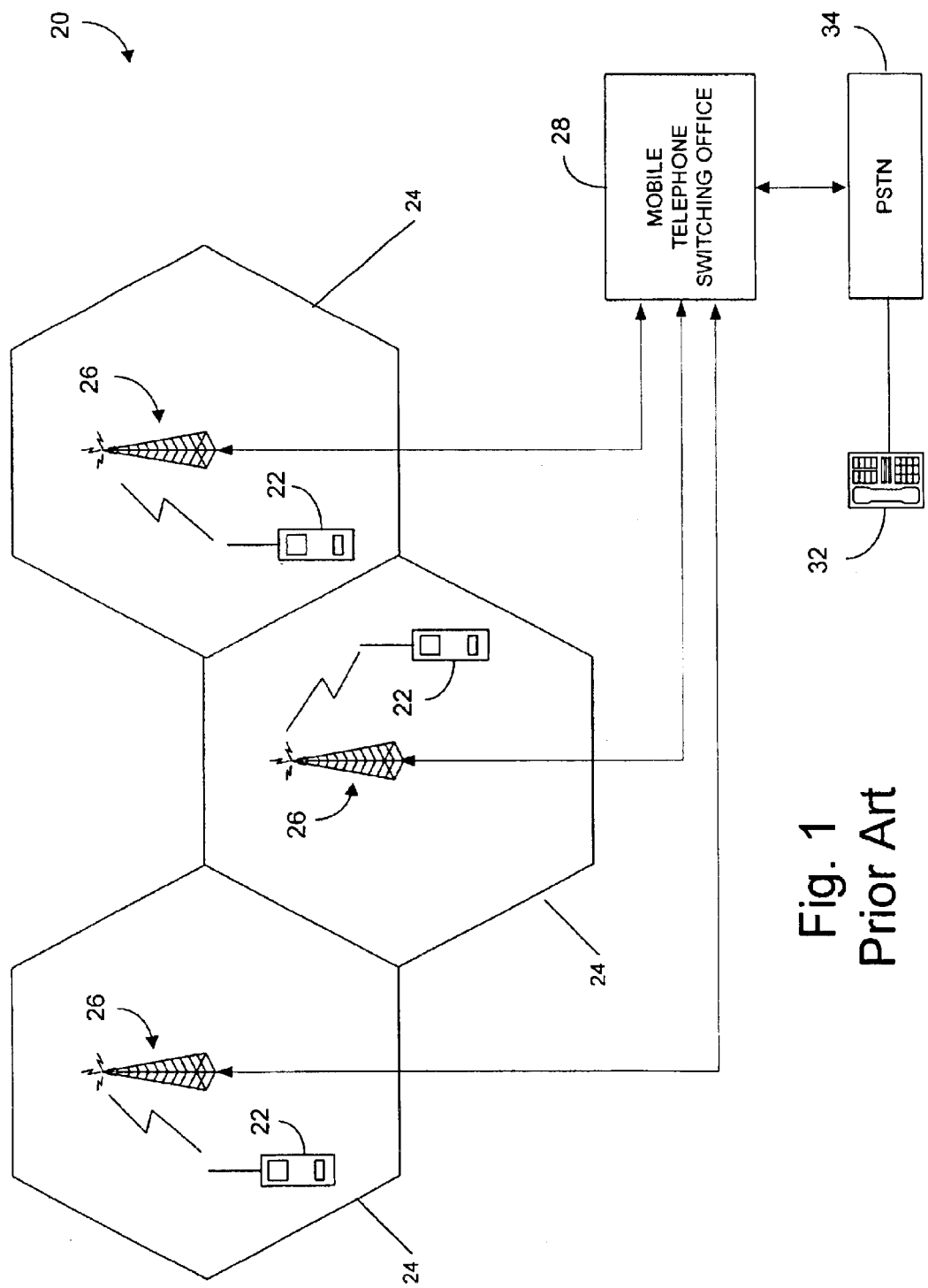
FIG. 1 is a schematic diagram illustrating a conventional terrestrial cellular communications system.
Figure 2:
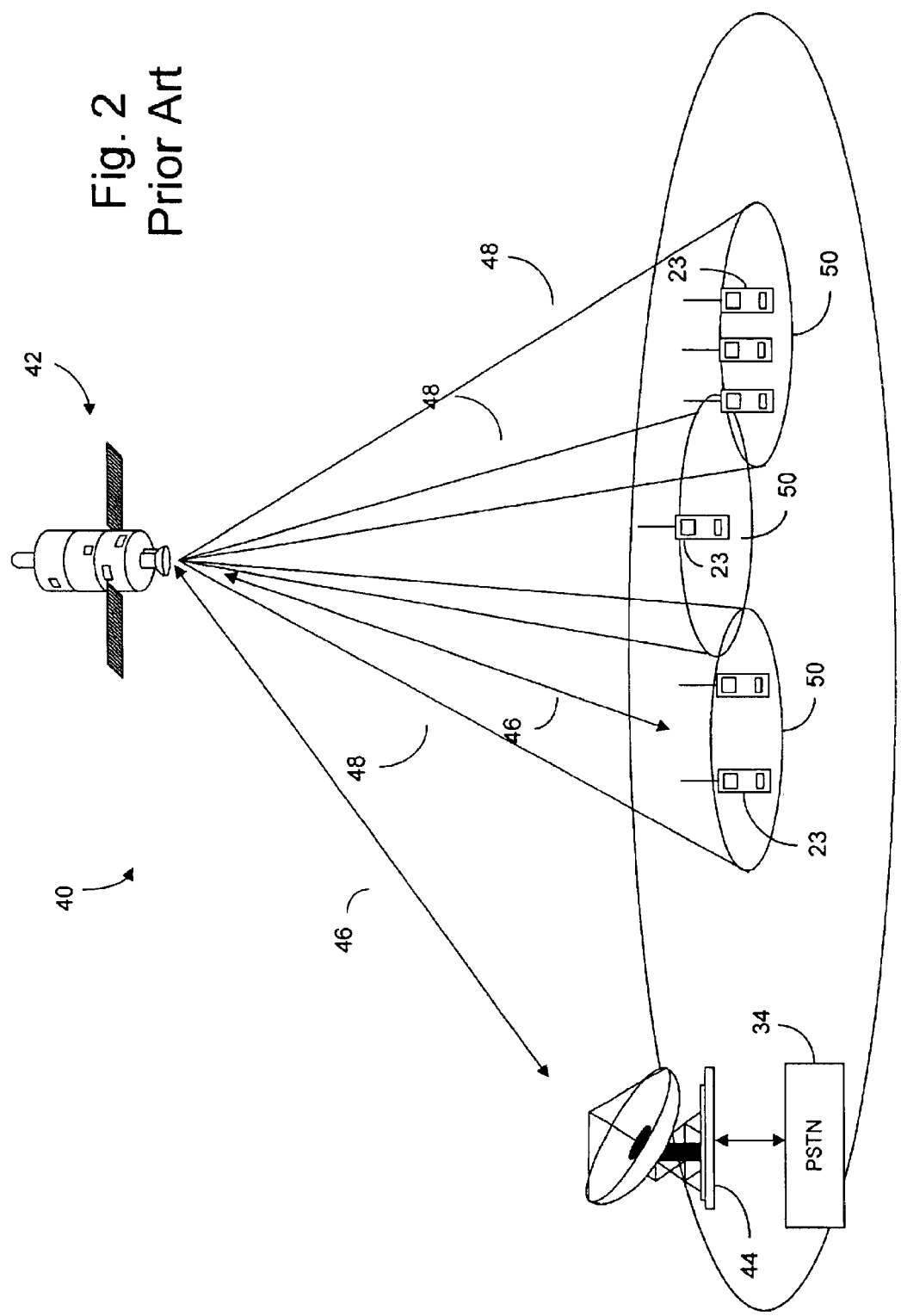
FIG. 2 is a schematic diagram illustrating a conventional satellite based wireless communications system.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

Figure 3:
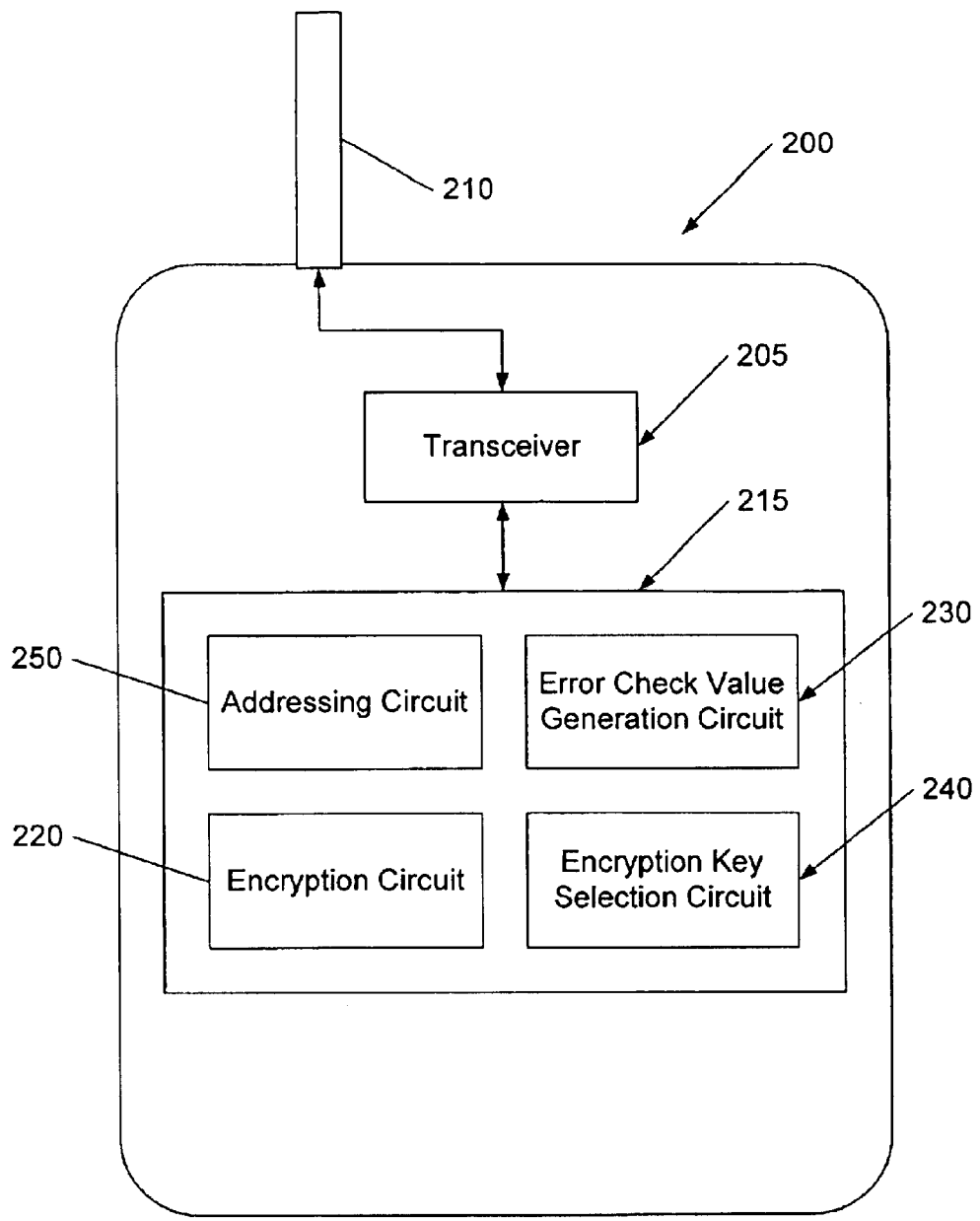
FIG. 3 is a schematic diagram illustrating a base station according to an aspect of the present invention.

The present invention will now be further described with reference to the schematic block diagram of FIG. 3. FIG. 3 illustrates an embodiment of a base station or other selective encryption system 200 according to the present invention. The base station 200 includes a transceiver 205 that is operative to transmit and receive RF communication signals via an antenna 210 under control of a controller 215. The controller receives messages from an external source, such as a mobile switching center (MSC) and processes the messages to produce physical layer bursts that are transmitted over physical channels by the transceiver 205 via the antenna 210. The base station 200 further includes an encryption circuit 220 that encrypts a message using a group encryption key and an error check value generation circuit 230 that generates an error check value based on the unencrypted message and adds the error check value to the encrypted message. An encryption key selection circuit 240 selects one of a plurality of candidate group encryption keys as the group encryption key based on a service associated with the message to be transmitted. An addressing circuit 250 determines whether the message is directed to an individual address, for general broadcast, or for broadcast to a limited group of receiver devices associated with a service having a corresponding group encryption key. The transceiver 205 broadcasts the encrypted message with the added error check value on a broadcast channel of the communication network. The transceiver 205 may further receive requests for the group encryption key from receiver devices and transmits the group encryption key with an individual address of a requesting receiver device. The encryption circuit 220, the error check value generation circuit 230, the encryption key selection circuit 240 and the addressing circuit 250 may be implemented as code running on the controller 215.

Figure 4:
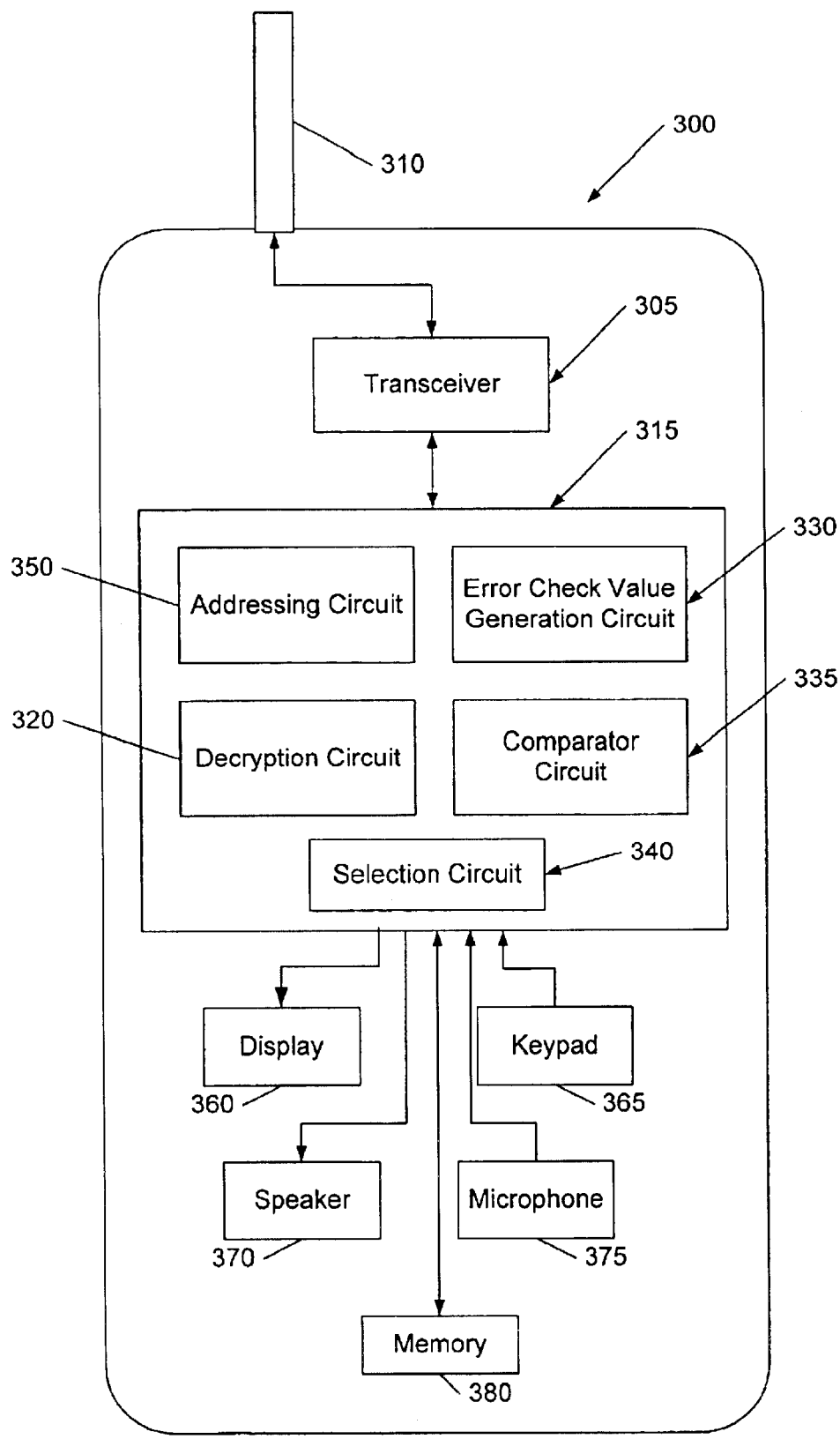
FIG. 4 is a schematic diagram illustrating a mobile terminal according to an aspect of the present invention.

Referring now to FIG. 4, an embodiment of a mobile terminal (receiver device) 300 or other selective decryption system according to an embodiment of the present invention will now be further described. The mobile terminal 300 includes a transceiver 305 that is operative to transmit and receive RF communication signals via an antenna 310 under control of a controller 315. The controller 315, such as a microprocessor, microcontroller or similar processing device, may execute program instructions stored in a memory 380 of the mobile terminal 300, such as a dynamic random access memory (DRAM), electrically erasable programmable read only memory (EEPROM) or other storage device. The controller 315 is operatively associated with user interface components of the mobile terminal 300 such as a display 360, keypad 365, speaker 370, and microphone 375, operations of which are known to those of skill in the art and will not be further discussed herein.

The mobile terminal 300 includes a decryption circuit 320 that decrypts a received message using a group encryption key. The message may be received by the transceiver 305 on a broadcast channel of a communication network. The mobile terminal 300 further includes an error check value generation circuit 330 that generates an error check value for the received message and for the decrypted version of the message generated by the decryption circuit 320. A comparator circuit 335 determines whether an error is indicated for the received message or for the decrypted message by comparing the error check value generation circuit output to the received error check value bits from the received message. A selection circuit 340 selects one of the received message or the decrypted message as a message to process responsive to the comparator circuit 335. Selection operations will be further described with reference to the flowcharts herein. The transceiver 305 may further be configured to transmit a request for the group encryption key and to receive the group encryption key from a selective encryption device such as the base station 200 described with reference to FIG. 3.

It will be appreciated that the various components illustrated by the blocks of FIGS. 3 and 4, while illustrated as separate circuits, may be implemented using a variety of hardware and software. For example, portions of the transceivers 205, 305 may be implemented using special-purpose hardware, such as an application specific integrated circuit (ASIC) and programmable logic devices such as gate arrays, and/or software or firmware running on a computing device such as a microprocessor, microcontroller or digital signal processor (DSP). It also will be appreciated that although functions of the transceivers 205, 305 may be integrated in a single device, such as a single ASIC, they may also be distributed among multiple devices. Functions of the various components, such as the addressing circuits 250, 350, the encryption circuit 220, the decryption circuit 320, the error check value generation circuits 230, 330, the comparator circuit 335 and the encryption key selection circuit 240 may also be implemented as code executing on a controller 215, 315 as illustrated in FIGS. 3 and 4 or may also be combined in one or more devices, such as an ASIC or DSP.

While the base station 200 has been generally described above with reference to encryption and transmission of messages and the mobile terminal 300 has been generally described with reference to decryption and reception of messages, corresponding to point to multi-point communications, it is to be understood that the present invention is not so limited. The base station 200 may operate to receive and decrypt messages and the mobile terminal 300 may also operate to encrypt and transmit messages, for example, in connection with services utilizing two way communications. It is further to be understood that the use of a group encryption key need not be utilized for the point to point (rather than point to multi-point) transmissions to the base station 200 from a mobile terminal 300 as the base station 200 may control access to a service utilizing the individual address of a mobile terminal 300.

The present invention will now be further described with reference to FIGS. 5–8. FIGS. 5–8 are flowchart illustrations illustrating exemplary operations for selective encryption and decryption of messages intended for a group according to aspects of the present invention. It will be understood that blocks of the flowchart illustrations of FIGS. 5–8, and combinations of blocks in the flowchart illustrations, may be implemented using electronic circuits included in base stations and wireless terminals, such as the base station 200 of FIG. 3 and the mobile terminal 300 of FIG. 4. It will also be appreciated that blocks of the flowchart illustrations of FIGS. 5–8, and combinations of blocks in the flowchart illustrations, may be implemented using components other than those illustrated in FIGS. 3 and 4, and that, in general, the blocks of the flowchart illustrations of FIGS. 5–8, and combinations of blocks in the flowchart illustrations, may be implemented in special purpose hardware such as discrete analog and/or digital circuitry, such as combinations of integrated circuits or one or more application specific integrated circuits (ASICs), as well as by computer program instructions which may be loaded onto a computer or other programmable data processing apparatus to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

Accordingly, blocks of the flowchart illustrations of FIGS. 5–8 support electronic circuits and other means for performing the specified functions, as well as combinations of steps for performing the specified functions. It will be understood that the circuits and other means supported by each block of the flowchart illustrations of FIGS. 5–8, and combinations of blocks therein, can be implemented by special purpose hardware, software or firmware operating on special or general purpose data processors, or combinations thereof.

Figure 5:
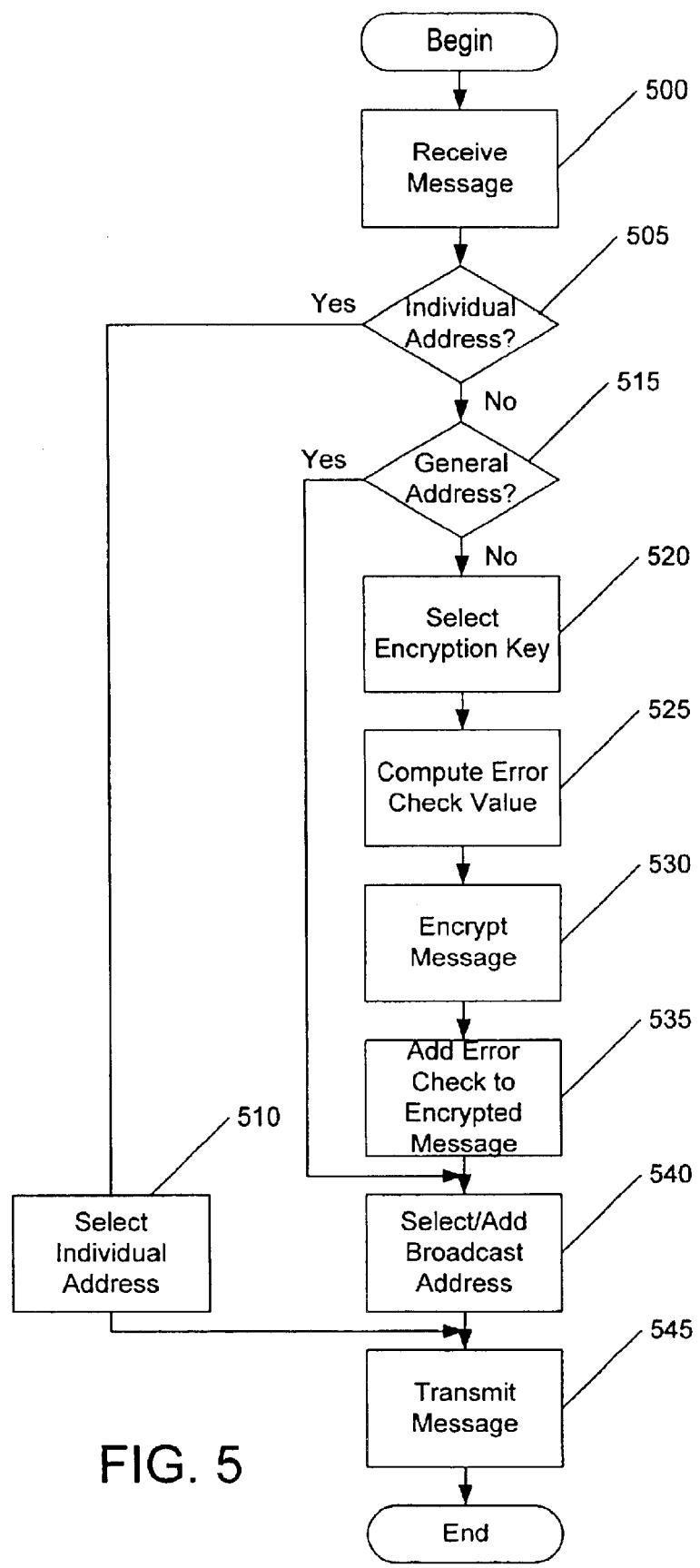
FIG. 5 is a flowchart illustration of exemplary operations for communicating a message according to an embodiment of the present invention.

Referring now to FIG. 5, operations begin at block 500 when the base station 200 receives a message for transmission. The message may be associated with a particular service, such as a premium service, which is initiating transmission of the message. The message may also be a message directed to a specific individual receiver station or intended for general distribution to a broadcast address of a communication network. The base station 200 determines if the received message is intended for an individual specified receiver address (block 505) and, if so, selects the desired individual address for inclusion with the message for transmission (block 510).

If the message is not intended for transmission to an individual address specified device, the base station 200 determines if the message is intended for general broadcast (block 515) and, if so, selects the broadcast address of the communication network for transmission with the message (block 540). If the received message is neither intended for an individual address receiver or general, broadcast, it is processed for transmission as a group addressed message as will now be described. A group encryption key for the received message is determined, preferably by determining the service associated with the message and selecting one of a plurality of candidate group encryption keys which is associated with the determined service as the group encryption key (block 520). It is to be understood that, as used herein, references to the received message from block 500 as an unencrypted message are directed to encryption provided by the base station device 200 only. It is further to be understood that the message may actually be provided to the base station 200 in an encrypted form where the encryption is provided by the provider of the associated service and wherein receiving devices subscribing to the associated service are provided a means to decrypt this service provider encryption by means which are beyond the scope of the present invention. Accordingly, such messages receiving an encryption protection at a service provider level unrelated to the present invention are to be considered as unencrypted messages as that term is used herein.

An error check value is generated for the received message (unencrypted message) (block 525). In one embodiment, redundancy bits, such as a cyclical redundancy check (CRC), are computed for the unencrypted received message at block 525. However, it is to be understood that other types of error detection codes and further error correction codes may be utilized to generate the error check value according to various embodiments of the present invention.

The unencrypted received message is then encrypted using the selected group encryption key (block 530). Preferably, the message not including the calculated error check value symbols (or bits) and the broadcast address, is encrypted according to the group encryption key. The error check value is then added, for example, by appending it to the encrypted message prior to transmission (block 535). The broadcast address of the communication network is then added as the associated destination address (block 540) and the encrypted message and added error check value is transmitted on a broadcast channel of the communication network with the associated destination address, preferably a broadcast address of the communication network (block 545).

It is further to be understood that, as used herein, a broadcast address of the communication network may be a selected one of a number of broadcast addresses utilized by a particular communication network. More generally, a broadcast address herein refers to an address associated with a point to multipoint transmission where particular services may wish to transmit to a subset of the devices included within the broadcast address group. Similarly, as used herein, the term "broadcast channel" refers to a point to multi-point communication channel and is not intended to be limited to any specific such channel defined using the term broadcast channel in the context of a particular communication protocol such as those identified above for cellular radiotelephones. Such protocols may include a plurality of point to multi-point channels, one or more of which may be referred to as a broadcast control channel, and others of which may be associated with different names, but all of which are still broadcast channels as that term is used herein. Furthermore, it is not limited to over air type channels where the multi-point receivers each receive the signal substantially at the same time but also encompasses other types of network channels such as a communication connection on a ring type computer network in which the broadcast channel may be implemented by packet forwarding where a first one of the multi-point receivers receives a broadcast address, reads the packet and forwards the packet on to a next multi-point receiver in the computer network.

Figure 6:
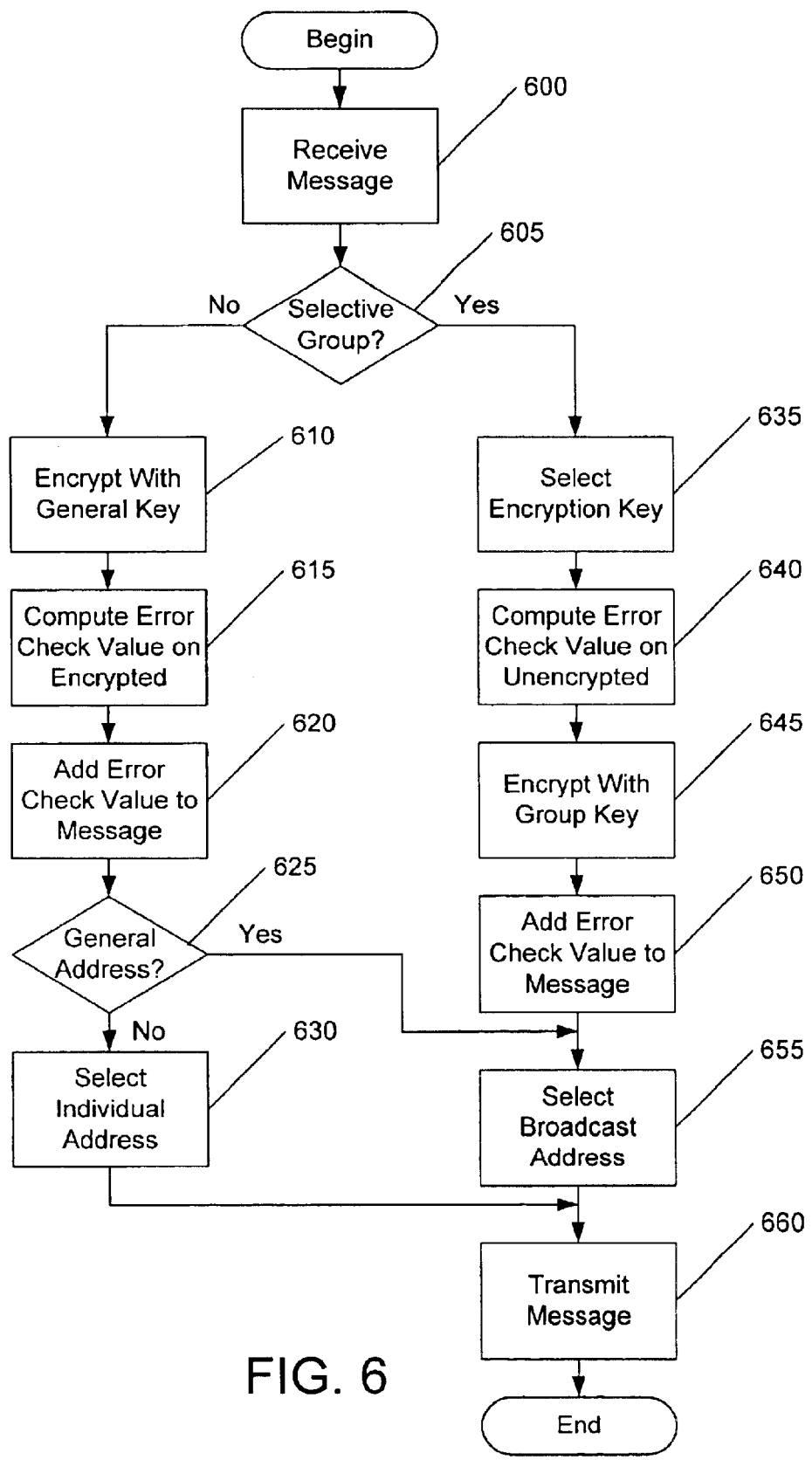
FIG. 6 is a flowchart illustration of exemplary operations for communicating a message according to another embodiment of the present invention.

Referring now to FIG. 6, a further embodiment of operations for a selective encryption system according to the present invention will now be described. Operations begin at block 600 with receipt of a message for transmission at the base station 200. The base station 200 determines if the unencrypted received message is associated with general broadcast, an individual address or with transmission to a group of receivers which define a subset of the broadcast address (block 605). If the unencrypted received message is associated with either general broadcast or an individual address, operations continue at block 610 with encryption of the unencrypted received message using a general encryption key. An error check value is generated based on the encrypted message (block 615). The error check value based on the encrypted message is then added to the encrypted message, preferably by appending it to the encrypted message (block 620). If the message is intended for general broadcast (block 625) then the broadcast address for the communication network is used with the message for transmission (block 655). If an individual address is associated with a message, the individual address is selected for transmission with the message (block 630). The message is then transmitted with the associated address (block 660). The encrypted message is transmitted along with the appended error check value generated based on the encrypted message.

For a message intended for a selected broadcast group, operations at blocks 635 through 655 proceed as described previously with reference to blocks 520 through 540 of FIG. 5. Accordingly, operations for these blocks will not be described further herein.

Figure 7:
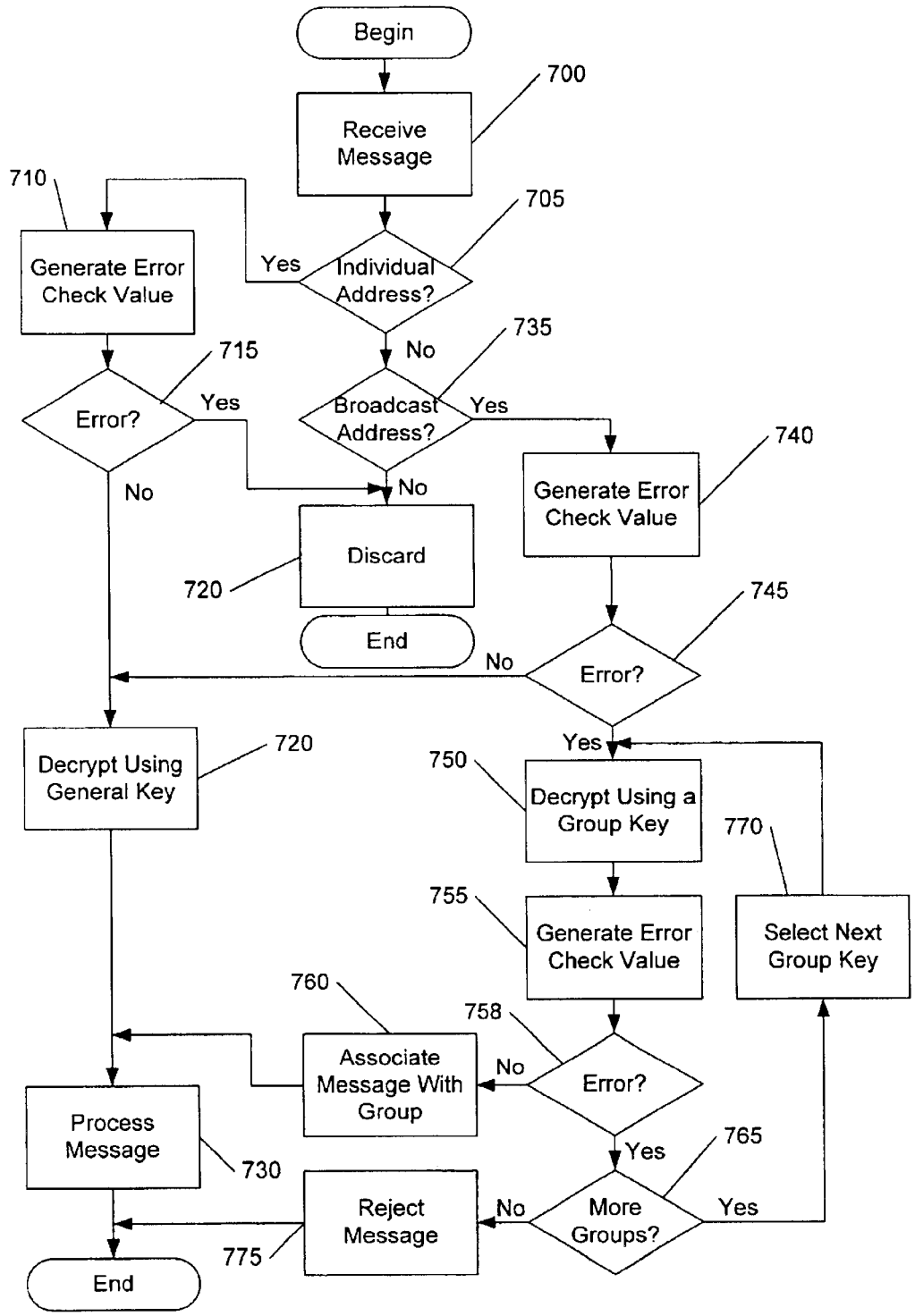
FIG. 7 is a flowchart illustration of exemplary operations for receiving a message according to another embodiment of the present invention.

Operations according to an embodiment of the present invention will now be further described with reference to FIG. 7 from the perspective of a receiver device providing selective decryption. Operations begin at block 700 when a mobile terminal (receiver device) 300 receives a message over the communication network from a base station 200. The addressing circuit 350 then determines whether the received message includes the individual address of the mobile terminal 300 (block 705). If so, an error check value is generated by the error check value generation circuit 330 (block 710) and compared to the error check value contained in the received message by the comparator circuit 335 (block 715). If the error check value test fails (block 715) the received message is assumed to contain a transmission error and is discarded (block 720). If the error check value test passes (block 715) the received message is decrypted using a general encryption key (block 720). Note that, for the embodiment illustrated in FIG. 7, received messages are encrypted either using a general key or a group key as described, for example, in reference to FIG. 6 above. The message is then further processed by the receiving mobile terminal 300 as appropriate for the type of message received (block 730).

If the message received on the broadcast channel of the communication network at block 700 does not carry an individual address (block 705), the mobile terminal 300 determines whether it carriers a broadcast address (block 735). If the message is neither directed to the individual address of the mobile terminal 300 or a broadcast address, it is discarded (block 720). If the message is associated with a broadcast address, operations move to block 740 with generation of an error check value, such as a CRC value, for the received message. If the generated error check value indicates no error (block 745) the message is decrypted using the general encryption key (block 720).

Note that, for group encryption key encrypted messages, the CRC is generated based on an unencrypted message as described with reference to FIGS. 5 and 6 above. In contrast, as described with reference to FIG. 6, for general broadcast messages, the CRC was generated based on the encrypted message. Accordingly, as shown by the decision at block 745, where the CRC shows no error when generated before decryption of the message, it is expected that the message corresponds to a general broadcast message rather then a selective group encrypted message. When the CRC check on the received message before decryption indicates a failure, however (block 745), the received message is processed as a selective group encrypted message.

The message is decrypted using a group encryption key (block 750). An error check value is then generated from the decrypted message (block 755). If the CRC value generated at block 755 corresponds to the CRC values contained in the received message (block 758), indicating no error, operations move to block 760 and the received message is assigned to a service group associated with the group encryption key used at block 750 to generate a successful error check value. If the error check value generated for the decrypted message at block 755 indicates an error and all candidate group encryption keys have already been tested (block 765) the message is rejected (block 775). Otherwise, a next one of the candidate group encryption keys is selected (block 770) and operations return to block 750. Operations continue for each of the candidate group encryption keys until either the error check value for the decrypted message indicates no error or each of the candidate group encryption keys has been tested.

The present invention thus allows messages belonging to a first premium service to be associated with the first group encryption key and messages belonging to a second premium service to be associated with a second group encryption key and so on. In effect, a particular service group may be identified by its association with a particular group encryption key as contrasted with the prior art approach of utilizing group addresses contained within a packet header in a transmitted message. Furthermore, encryption may be provided for general broadcast messages, individual address messages and group encrypted messages while still allowing ready receipt and decryption of all such messages at a receiver device. In particular, the generation of error check values before encryption for selective group encryption messages and after encryption for general broadcast and individual address messages facilitates detection of the message type and use of the appropriate decryption key as described with reference to FIG. 7.

While a general encryption key has been described for use with both general broadcast and individual addresses messages, individual addresses may also be provided with specific encryption keys associated with each address. It is further to be understood that messages may be rejected (block 775) either due to errors in reception or because the message belongs to a premium service group not associated with or subscribed to by the receiver. Furthermore, operations for checking the error check value at blocks 710, 740, and 755 while generally described with reference to an error detection code, such as a CRC, may also be provided utilizing other error detection codes of error correction codes. For example, in the case of an error correction code, the code may be allowed to correct any number of transmission errors within its capabilities, for example, after decryption of the message in the case of block 755. The detection of a successful error check may then be made with regard to the version of the message after correction by the error correcting code. If the number of errors falls within the capability of the error correction code to correct, the errors are corrected and the error check value is considered to have passed (for example at block 758 operations would move to block 760). Otherwise the error check value test is considered to have indicated an error.

A further aspect of the present invention related to provision of group encryption keys to mobile terminal devices 300 will now be described with reference to the illustrated embodiment of FIG. 8. Operations begin at block 800 when a mobile terminal 300 which subscribes to a premium service associated with a group encryption key requests the associated group encryption key from a base station 200. The base station 200 then receives the request for the associated one of a plurality of group encryption keys for the premium services (block 805). The requesting mobile terminal is then associated with the premium service which is associated with the requested one of the plurality of group encryption keys (block 810). Operations at block 810 may include obtaining payment authorization or confirming availability of the requested associated premium service for the specifically identified user requesting the group encryption key. In other words, operations at block 810 in associating the user (mobile terminal) with a particular service preferably make some provision for obtaining authorization and/or payment for providing access to such service to the requesting user. The requested group encryption key is then transmitted to the requesting user device, preferably, on a broadcast channel of the communication network with the associated individual address of the requesting user device (block 815). The group encryption key is then received by the requesting device (block 820).

Figure 8:
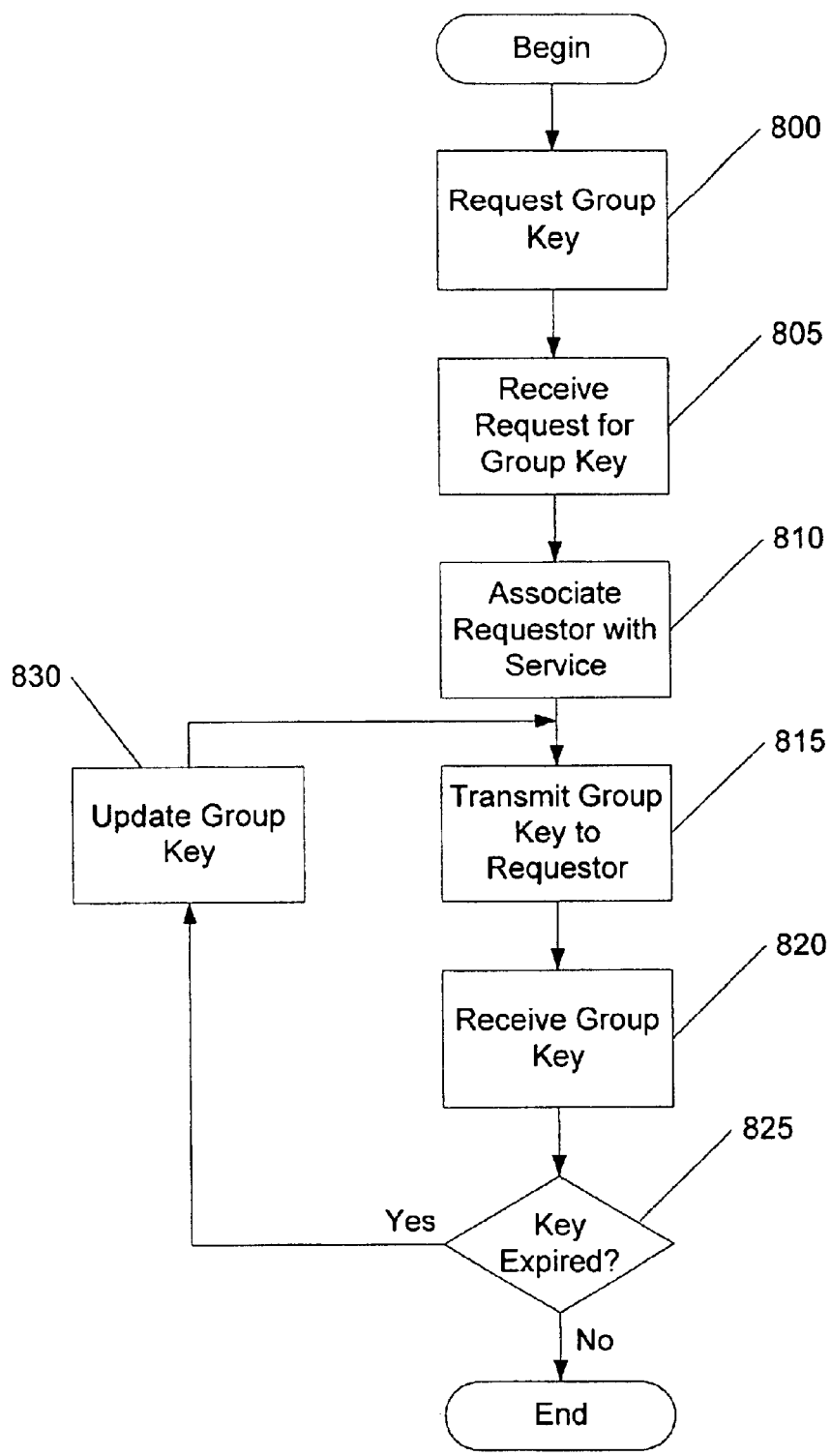
FIG. 8 is a flowchart illustrating management of group addresses according to another aspect of the present invention.

For the illustrated embodiment of FIG. 8, the group encryption keys may be changed periodically, with each authorized receiver device being notified of the changes, preferably by the way of their individual addresses as described above. At block 825, if a group encryption key previously in use requires updating, for example, if the key has an associated duration and has exceeded its associated duration, the group encryption key is updated (block 830) and operations return to block 815 for transmission of the updated group encryption key to authorized users. In various embodiments, group encryption keys may be changed on a periodic basis for long standing groups with each receiver being notified of the changes. Alternatively, group encryption keys may be assigned on demand and persist for only a short time duration, for example, for one days worth of stock price monitoring away from home for a traveling investor utilizing a device, such as a personal digital assistant, as a mobile terminal 300.

While the selective encryption device has been generally described and 1=referred to herein as a base station 200, it is to be understood that the capabilities related to selective encryption need not be provided at a base station. For example, a server device or a mobile switching center associated with a communication network may process messages and provide for selective encryption and appropriate addressing as well as generation of error check values and the base station 200 may simply act as a transponder to transmit the messages on a broadcast channel of the communication network. The apparatus and operations according to the present invention may also be divided across multiple devices, including performing some portion at the base station and other portions at a mobile switching center or a server device available to the communications network. Furthermore, while generally described with reference to a wireless communication network, it is to be understood that the present invention may be applied to a variety of types of networks including wireline local area networks (LAN), wide area networks (WAN) and metropolitan area networks (MAN) and is not limited to wireless or cellular networks.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of selective encryption of transmitted messages, comprising the steps of:
   determining a group encryption key for an unencrypted message;
   generating an error check value for the unencrypted message;
   encrypting the unencrypted message using the group encryption key; and
   transmitting the encrypted message and the error check value on a channel of a communication network with an associated destination address.

2. A method according to claim 1, wherein the associated destination address is a broadcast address of the communication network and wherein the channel is a broadcast channel of the communication network.

3. A method according to claim 2 wherein the step of determining a group encryption key for a message comprises the step of determining a service associated with the message and selecting a group encryption key associated with the determined service.

4. A method according to claim 2 wherein the step of generating an error check value comprises the step of computing redundancy bits for the message.

5. A method according to claim 4 wherein the step of transmitting further comprises transmitting the encrypted message with the unencrypted redundancy bits appended to the encrypted message.

6. A method according to claim 4 wherein the step of determining a group encryption key is preceded by the step of determining if the unencrypted message is intended for a broadcast group having an associated group encryption key; and
   wherein the steps of determining a group encryption key, generating an error check value, encrypting the unencrypted message and transmitting the encrypted message are not performed if the unencrypted message is not intended for a broadcast group having an associated group encryption key.

7. A method according to claim 6 further comprising the steps of:
   determining if the unencrypted message is associated with at least one of general broadcast or an individual address;
   transmitting the unencrypted message on the broadcast channel of the communication network with the broadcast address of the communication network if the unencrypted message is associated with general broadcast; and
   transmitting the unencrypted message on the communication network with the individual address if the unencrypted message is associated with an individual address.

8. A method according to claim 6 further comprising the steps of:
   determining if the unencrypted message is associated with at least one of general broadcast or an individual address;
   encrypting the unencrypted message using a general encryption key if the unencrypted message is associated with at least one of general broadcast or an individual address;
   generating an error check value based on the encrypted message if the unencrypted message is associated with at least one of general broadcast or an individual address; and
   transmitting the encrypted message and the error check value based on the encrypted message on the communication network with the individual address if the unencrypted message is associated with an individual address and with the broadcast address of the communication network if the unencrypted message is associated with general broadcast.

9. A method according to claim 2 further comprising the steps of:
   receiving the encrypted message and added error check value on the broadcast channel of the communication network;
   determining if the received message is directed to the broadcast address of the communication network;
   generating an error check value for the received message;
   determining if the error check value indicates an error;
   decrypting the received message using the group encryption key if the received message is directed to a broadcast address of the communication network and the error check value indicates an error;
   generating an error check value for the decrypted message; and
   assigning the received message to a group associated with the group encryption key if the error check value for the decrypted message indicates no error.

10. A method according to claim 9 wherein the step of determining a group encryption key for an unencrypted message comprises the step of determining one of a plurality of services which is associated with the message and selecting a one of a plurality of group encryption keys which is associated with the determined one of the plurality of services which is associated with the message as the group encryption key for the unencrypted message.

11. A method according to claim 10 further comprising the step of repeating the steps of decrypting, generating an error check value for the decrypted message and assigning the received message to a group using selected ones of the plurality of group encryption keys as the group encryption key until at least one of the error check value for the decrypted message indicates no error and each of the selected ones of the plurality of group encryption keys has been used as the group encryption key.

12. A method according to claim 11 further comprising the steps of:
   receiving a request for one of the plurality of group encryption keys from a user;
   associating the user with a service associated with the requested one of the plurality of group encryption keys; and
   transmitting the requested one of the plurality of group encryption keys to the user on the broadcast channel of the communication network with an associated individual address of the user.

13. A method according to claim 3 further comprising the steps of:
receiving a request for the group encryption key from a user;
associating the user with the service associated with the group encryption key; and
transmitting the group encryption key to the user on the broadcast channel of the communication network with an associated individual address of the user.

14. A method according to claim 13 wherein the group encryption key has an associated duration and wherein the step of determining a group encryption key for the unencrypted message further comprises the step of updating a group encryption key for the unencrypted message when a previous group encryption key has exceeded its associated duration.

15. A method according to claim 13 wherein the step of transmitting the group encryption key is followed by the steps of:
updating the group encryption key; and
transmitting the updated group encryption key to users associated with the service associated with the group encryption key using associated individual addresses of the users associated with the service associated with the group encryption key.

16. A method according to claim 13 further comprising the steps of:
receiving the transmitted group encryption key;
receiving the encrypted message and added error check value on the broadcast channel of the communication network;
determining if the received message is directed to the broadcast address of the communication network;
generating an error check value for the received message;
determining if the error check value indicates an error;
decrypting the received message using the group encryption key if the received message is directed to a broadcast address of the communication network and the error check value indicates an error;
generating an error check value for the decrypted message; and
assigning the received message to a group associated with the group encryption key if the error check value for the decrypted message indicates no error.

17. A method of selective decryption of transmitted messages, comprising the steps of:
receiving a message on a channel of a communication network;
determining if the received message is directed to a broadcast address of the communication network;
generating an error check value for the received message;
determining if the error check value indicates an error;
decrypting the received message using a group encryption key if the received message is directed to a broadcast address of the communication network and the error check value for the received message indicates an error;
generating an error check value for the decrypted message; and
assigning the received message to a group associated with the group encryption key if the error check value for the decrypted message indicates no error.

18. A method according to claim 17 wherein the step of decrypting the received message is preceded by the steps of:
transmitting a request for the group encryption key; and
receiving the group encryption key on the channel of the communication network.

19. A method according to claim 17 further comprising the step of repeating the steps of decrypting, generating an error check value for the decrypted message and assigning the received message to a group using ones of a plurality of group encryption keys as the group encryption key until at least one of the error check value for the decrypted message indicates no error and each of the ones of the plurality of group encryption keys has been used as the group encryption key.

20. A method according to claim 17 wherein the step of generating an error check value for the decrypted message comprises the steps of:
computing redundancy bits for the decrypted message; and
comparing the computed redundancy bits to redundancy bits included with the received message to determine if an error is indicated for the decrypted message.

21. A method according to claim 17 wherein the step of generating an error check value for the decrypted message comprises the steps of:
applying an error correction code to the decrypted message; and
determining that an error is indicated for the decrypted message if any errors remain in the decrypted message after applying the error correction code to the decrypted message.

22. A method according to claim 17 further comprising the steps of:
determining if the received message is directed to an individual address of a receiver device receiving the message; and
decrypting the received message using a general encryption key different from the group encryption key if the received message is directed to the individual address.

23. A method according to claim 22 further comprising the step of decrypting the received message using the general encryption key if the received message is directed to a broadcast address of the communication network and the error check value for the received message indicates no error.

24. A selective encryption system comprising:
an encryption circuit that encrypts a message using a group encryption key;
an error check value generation circuit that generates an error check value based on the unencrypted message and adds the error check value to the encrypted message;
a transmitter that transmits the encrypted message with the added error check value on a channel of a communication network; and
an encryption key selection circuit that selects one of a plurality of candidate group encryption keys as the group encryption key based on a service associated with the message.

25. A system according to claim 24 further comprising:
a receiver that receives requests for the group encryption key; and
wherein the transmitter is configured to transmit the group encryption key with an individual address of a requesting device responsive to receiving a request for the group encryption key; and
wherein the transmitter transmits the encrypted message with a broadcast address of the communication network.

26. A selective decryption system comprising:
   a receiver that receives a message on a channel of a communication network;
   a decryption circuit that decrypts the message using a group encryption key;
   an error check value generation circuit that generates an error check value for the received message and the decrypted message;
   a comparator circuit responsive to the error check value generation circuit that determines whether an error is indicated for the received message and the decrypted message; and
   a selection circuit responsive to the comparator circuit that selects one of the received message or the decrypted message as a message to process.

27. A system according to claim 26 further comprising:
   a transmitter that transmits a request for the group encryption key; and
   wherein the receiver is configured to receive the group encryption key.

28. A system for selective encryption of transmitted messages, comprising:
   means for determining a group encryption key for an unencrypted message;
   means for generating an error check value for the unencrypted message;
   means for encrypting the unencrypted message using the group encryption key;
   means for adding the error check value to the encrypted message; and
   means for transmitting the encrypted message and added error check value on a channel of a communication network with an associated destination address.

29. A system according to claim 28, wherein the associated destination address is a broadcast address of the communication network and wherein the channel is a broadcast channel of the communication network.

30. A system according to claim 29 wherein the means for determining a group encryption key for a message comprises means for determining a service associated with the message and selecting a group encryption key associated with the determined service.

31. A system according to claim 29 wherein the means for generating an error check value comprises means for computing redundancy bits for the message.

32. A system according to claim 31 further comprising:
   means for determining if the unencrypted message is associated with at least one of general broadcast or an individual address;
   means for transmitting the unencrypted message on a broadcast channel of a communication network with the broadcast address of the communication network if the unencrypted message is associated with general broadcast; and
   means for transmitting the unencrypted message on a broadcast channel of a communication network with the individual address if the unencrypted message is associated with an individual address.

33. A system according to claim 31 further comprising:
   means for determining if the unencrypted message is associated with at least one of general broadcast or an individual address;
   means for encrypting the unencrypted message using a general encryption key if the unencrypted message is associated with at least one of general broadcast or an individual address;
   means for generating an error check value based on the encrypted message if the unencrypted message is associated with at least one of general broadcast or an individual address; and
   means for adding the error check value based on the encrypted message to the encrypted message if the unencrypted message is associated with at least one of general broadcast or an individual address; and
   means for transmitting the encrypted message and the appended error check value based on the encrypted message on a broadcast channel of a communication network with the individual address if the unencrypted message is associated with an individual address and with the broadcast address of the communication network if the unencrypted message is associated with general broadcast.

34. A system according to claim 30 further comprising:
   means for receiving a request for the group encryption key from a user;
   means for associating the user with the service associated with the group encryption key; and
   means for transmitting the group encryption key to the user on the broadcast channel of the communication network with an associated individual address of the user.

35. A system according to claim 34 wherein the group encryption key has an associated duration and wherein the means for determining a group encryption key for the unencrypted message further comprises means for updating a group encryption key for the unencrypted message when a previous group encryption key has exceeded its associated duration.

36. A system according to claim 34 further comprising:
   means for updating the group encryption key; and
   means for transmitting the updated group encryption key to users associated with the service associated with the group encryption key using associated individual addresses of the users associated with the service associated with the group encryption key.

37. A system according to claim 34 further comprising:
   means for receiving the transmitted group encryption key;
   means for receiving the encrypted message and added error check value on the broadcast channel of the communication network;
   means for determining if the received message is directed to the broadcast address of the communication network;
   means for generating an error check value for the received message;
   means for determining if the error check value indicates an error;
   means for decrypting the received message using the group encryption key if the received message is directed to a broadcast address of the communication network and the error check value indicates an error;
   means for generating an error check value for the decrypted message; and
   means for assigning the received message to a group associated with the group encryption key if the error check value for the decrypted message indicates no error.

38. A system for selective decryption of transmitted messages, comprising:

means for receiving a message on a channel of a communication network;

means for determining if the received message is directed to a broadcast address of the communication network;

means for generating an error check value for the received message;

means for determining if the error check value indicates an error;

means for decrypting the received message using a group encryption key if the received message is directed to a broadcast address of the communication network and the error check value for the received message indicates an error;

means for generating an error check value for the decrypted message; and means for assigning the received message to a group associated with the group encryption key if the error check value for the decrypted message indicates no error.

39. A system according to claim 38 further comprising:

means for transmitting a request for the group encryption key; and means for receiving the group encryption key on the channel of the communication network.

40. A system according to claim 38 further comprising means for repeating the steps of decrypting, generating an error check value for the decrypted message and assigning the received message to a group using ones of a plurality of group encryption keys as the group encryption key until at least one of the error check value for the decrypted message indicates no error and each of the ones of the plurality of group encryption keys has been used as the group encryption key.

41. A system according to claim 38 wherein the means for generating an error check value for the decrypted message further comprises:

means for computing redundancy bits for the decrypted message; and means for comparing the computed redundancy bits to redundancy bits included with the received message to determine if an error is indicated for the decrypted message.

42. A system according to claim 38 wherein the means for generating an error check value for the decrypted message further comprises:

means for applying an error correction code to the decrypted message; and means for determining that an error is indicated for the decrypted message if any errors remain in the decrypted message after applying the error correction code to the decrypted message.

43. A system according to claim 38 further comprising:

means for determining if the received message is directed to an individual address of a receiver device receiving the message; and means for decrypting the received message using a general encryption key different from the group encryption key if the received message is directed to the individual address.

44. A system according to claim 43 further comprising means for decrypting the received message using the general encryption key if the received message is directed to a broadcast address of the communication network and the error check value for the received message indicates no error.

* * * * *